(12) United States Patent
Matsushita et al.

(10) Patent No.: US 11,536,884 B2
(45) Date of Patent: Dec. 27, 2022

(54) OPTICAL DEVICE AND ELECTRONIC DEVICE

(71) Applicant: Seiko Epson Corporation, Tokyo (JP)

(72) Inventors: Tomonori Matsushita, Chino (JP); Teruyuki Nishimura, Matsumoto (JP); Nozomu Hirokubo, Shiojiri (JP)

(73) Assignee: SEIKO EPSON CORPORATION

( * ) Notice: Subject to any disclaimer, the term of this patent is extended or adjusted under 35 U.S.C. 154(b) by 608 days.

(21) Appl. No.: 16/554,681

(22) Filed: Aug. 29, 2019

(65) Prior Publication Data

US 2020/0073034 A1    Mar. 5, 2020

(30) Foreign Application Priority Data

Aug. 30, 2018    (JP) .............................. JP2018-161124

(51) Int. Cl.
  *G02B 5/28*    (2006.01)
  *G01J 3/26*    (2006.01)

(52) U.S. Cl.
  CPC ................ *G02B 5/285* (2013.01); *G01J 3/26* (2013.01)

(58) Field of Classification Search
  CPC .................................. G02B 5/285; G01J 3/26
  See application file for complete search history.

(56) References Cited

U.S. PATENT DOCUMENTS

| | | |
|---|---|---|
| 2004/0008435 A1 | 1/2004 | Takahashi et al. |
| 2005/0018331 A1 | 1/2005 | Pautet et al. |
| 2012/0044492 A1 | 2/2012 | Matsushita et al. |
| 2016/0379730 A1* | 12/2016 | Dinger ................ G03F 7/70166 355/67 |
| 2018/0095192 A1* | 4/2018 | Sonoda ..................... B32B 9/00 |
| 2018/0348510 A1* | 12/2018 | Yasuda .............. G02B 27/0018 |
| 2020/0209436 A1* | 7/2020 | Nakamura ............. G02B 1/041 |
| 2020/0348451 A1* | 11/2020 | Umeda .................. G02B 1/116 |

FOREIGN PATENT DOCUMENTS

| | | |
|---|---|---|
| EP | 2 689 427 A1 | 1/2014 |
| JP | H06-148692 A | 5/1994 |
| JP | 2001-174629 A | 6/2001 |

(Continued)

OTHER PUBLICATIONS

Extended European Search Report for Application No. EP 19 19 4069 dated Jan. 24, 2020 (8 pages).

(Continued)

*Primary Examiner* — William R Alexander
*Assistant Examiner* — Sharrief I Broome
(74) *Attorney, Agent, or Firm* — Harness, Dickey & Pierce, P.L.C.

(57) ABSTRACT

An optical device includes an optical member having a plurality of first optical layers and a plurality of second optical layers having a refractive index different from that of the first optical layer in which the first optical layers and the second optical layers are laminated, and a layer thickness changing electrode that changes a thickness of the first optical layer in a lamination direction of the first optical layers and the second optical layers, in which the optical member is provided in a pair, and the pair of optical members is disposed to face each other through a gap, and a gap changing driver that changes a dimension of the gap.

7 Claims, 10 Drawing Sheets

(56) References Cited

FOREIGN PATENT DOCUMENTS

| | | | | |
|---|---|---|---|---|
| JP | 2001174629 | A | * | 6/2001 |
| JP | 2004-133285 | A | | 4/2004 |
| JP | 2004133285 | A | * | 4/2004 |
| JP | 2004-151493 | A | | 5/2004 |
| JP | 2004-279856 | A | | 10/2004 |
| JP | 2008-129504 | A | | 6/2008 |
| JP | 2009-204381 | A | | 9/2009 |
| JP | 5050922 | B2 | | 10/2012 |
| JP | 2015-018280 | A | | 1/2015 |

OTHER PUBLICATIONS

Abdallah et al., "Thermal Analysis of Electrostatic Micro Actuator", International Journal of Mechatronics, Electrical and Computer Technology, vol. 4, Jan. 31, 2014, pp. 23-32.

\* cited by examiner

OPTICAL DEVICE AND ELECTRONIC DEVICE

The present application is based on, and claims priority from JP Application Serial Number 2018-161124, filed Aug. 30, 2018, the disclosure of which is hereby incorporated by reference herein in its entirety.

BACKGROUND

1. Technical Field

The present disclosure relates to an optical device and an electronic device.

2. Related Art

In the related art, an optical device (variable wavelength interference filter) is known, including an optical member (optical multilayer film mirror) in which high refractive layer and low refractive layer are alternately laminated (for example, see PTL 1 Japanese Patent Application Publication No. 2009-204381).

The variable wavelength interference filter described in PTL 1 Japanese Patent Application Publication No. 2009-204381, has a configuration in which a lower mirror formed of an optical multilayer film mirror and an upper mirror formed of an optical multilayer film mirror are disposed to face each other through a gap. In such a variable wavelength interference filter, light of a wavelength according to gap dimension can be transmitted through the variable wavelength interference filter by changing the gap dimension between the lower mirror and the upper mirror.

Moreover, in this variable wavelength interference filter, Si or Ge is used for the high refractive layer of the optical multilayer film mirror, and air is used for the low refractive layer. In such an optical multilayer film mirror, a ratio of the refractive index of the high refractive layer to the refractive index of the low refractive layer is increased, and it is possible to enable a wide bandwidth to have high reflectance characteristics, and as a result, the variable wavelength bandwidth of the variable wavelength interference filter is also widened.

However, in a variable wavelength interference filter using an optical multilayer film mirror, the thicknesses of a high refractive layer and a low refractive layer are usually designed based on central wavelength $\lambda_0$ of the variable wavelength bandwidth of light transmitted through the variable wavelength interference filter. That is, the optical multilayer film mirror is designed such that the high refractive layer meets $n_H d_H = \lambda_0/4$, and the low refractive layer meets $n_L d_L = \lambda_0/4$ where the refractive index of the high refractive layer is $n_H$, the thickness of the high refractive layer is $d_H$, the refractive index of the low refractive layer is $n_L$, and the thickness of the low refractive layer is $d_L$.

Therefore, when transmitting light in the vicinity of the central wavelength $\lambda_0$ through the variable wavelength interference filter, half value width is narrowed in spectral characteristics that is relationship between wavelength and transmittance of transmission light. That is, the variable wavelength interference filter can transmit light in the vicinity of the central wavelength $\lambda_0$ with a high resolution.

However, when transmitting light near a wavelength (edge wavelength) that is away from the central wavelength $\lambda_0$ in the variable wavelength bandwidth, the half value width is widened in the spectral characteristics as compared with when the central wavelength $\lambda_0$ is transmitted. That is, it is difficult to transmit light of edge wavelength through the variable wavelength interference filter with the high resolution.

SUMMARY

An optical device according to a first application example includes an optical member having a plurality of first optical layers and a plurality of second optical layers having a refractive index different from that of the first optical layer in which the first optical layers and the second optical layers are laminated, a layer thickness changing unit that changes a thickness of the first optical layer in a lamination direction of the first optical layers and the second optical layers, in which the optical member is provided in a pair, and the pair of optical members is disposed to face each other through a gap, and a gap changing unit that changes a dimension of the gap.

In the optical device according to the application example, the plurality of first optical layers may be fluid layers formed of a fluid, a pair of electrodes may be disposed with the first optical layers interposed therebetween in the lamination direction, and the layer thickness changing unit may change a voltage applied between the pair of electrodes.

In the optical device according to the application example, the plurality of first optical layers may be fluid layers formed of a fluid, the plurality of second optical layers may have conductivity, and the layer thickness changing unit may change a voltage applied between two second optical layers disposed at both ends with respect to the lamination direction.

An optical device according to a second application example includes an optical member having a plurality of first optical layers, and a plurality of second optical layers formed of an electro-optical crystal of which a refractive index is changed by an applied voltage, and formed by laminating the first optical layers and the second optical layers, a refractive index changing unit that changes a refractive index of the second optical layer by changing a voltage applied to the second optical layer, in which the optical members are provided in a pair, and the pair of optical members is disposed to face each other through a gap, and a gap changing unit that changes a dimension of the gap.

In the optical device according to the first application example, the gap changing unit may change the dimension of the gap according to wavelength of light transmitted through the pair of optical members, and the layer thickness changing unit may change the thickness of the first optical layer according to the wavelength of the light transmitted through the pair of optical members.

In the optical device according to the second application example, the gap changing unit may change the dimension of the gap according to the wavelength of light transmitted through the pair of optical members, and the refractive index changing unit may change the refractive index of the second optical layer according to the wavelength of the light transmitted through the pair of optical members.

An electronic device according to a third application example includes the optical device according to the first application example or the second application example and a control unit that controls the optical device.

DESCRIPTION OF EXEMPLARY EMBODIMENTS

First Embodiment

Hereinafter, the first embodiment will be described below.

Figure 1:
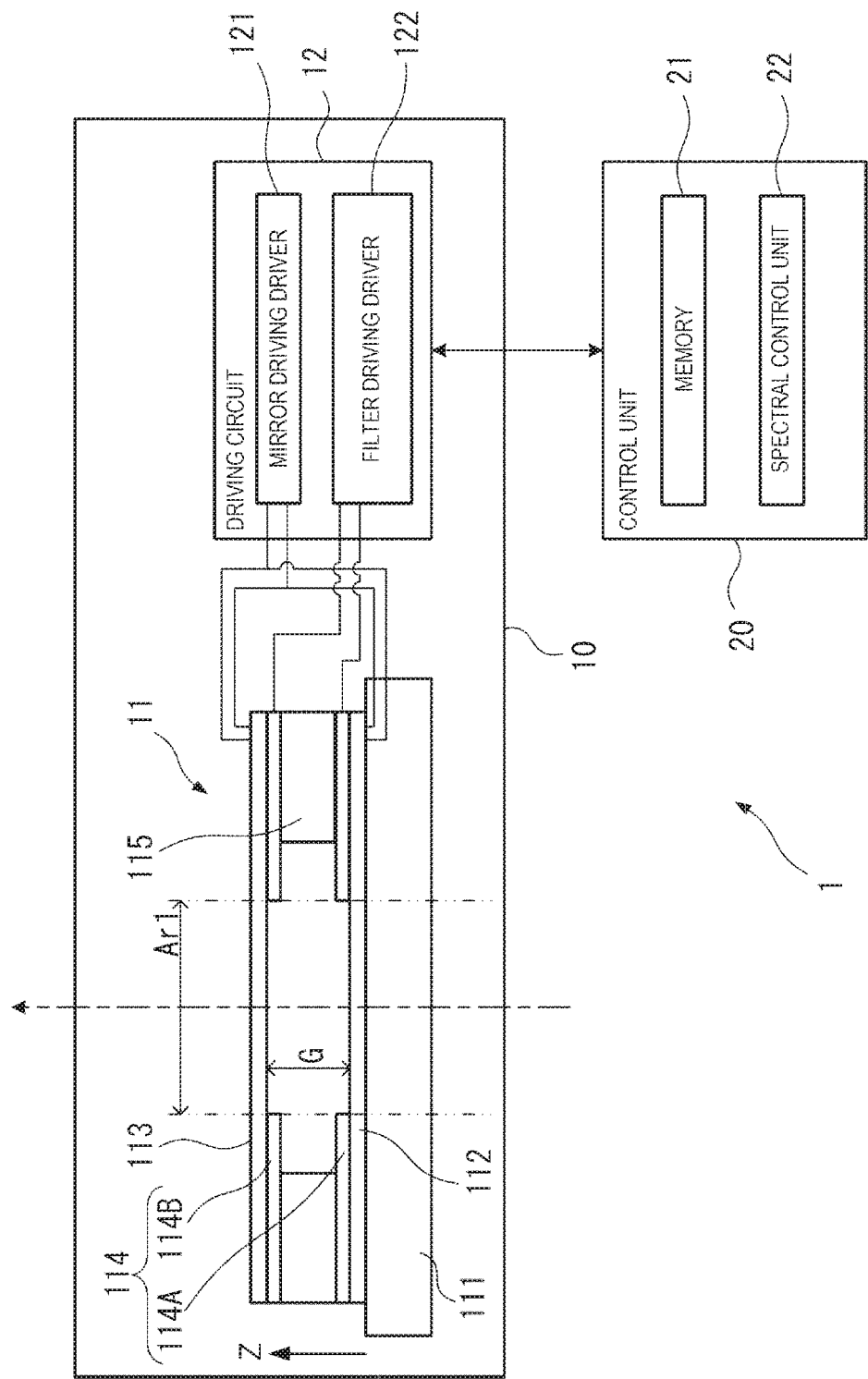
FIG. 1 is a schematic diagram showing a configuration of a spectroscopic device according to the first embodiment.

FIG. 1 is a schematic diagram showing a configuration of a spectroscopic device according to the first embodiment.
Overall Configuration of Spectroscopic Device 1

The spectroscopic device 1 is an electronic device that, from incident light, disperses and outputs light of the desired target wavelength as set by a user. As shown in FIG. 1, the spectroscopic device 1 includes a spectroscopic unit 10 which is an optical device, and a control unit 20. Hereinafter, each component will be described in detail.
Configuration of Spectroscopic Unit 10

As illustrated in FIG. 1, the spectroscopic unit includes a variable wavelength interference filter 11 and a driving circuit 12 that drives the variable wavelength interference filter 11.

The variable wavelength interference filter 11 includes a Fabry-Perot interferometer, a substrate 111, a first optical member 112, a second optical member 113, a gap changing unit 114, and a gap forming spacer 115. The first optical member 112 and the second optical member 113 constitute a pair of optical members facing each other through an air gap G.

The first optical member 112 is an optical member provided on the substrate 111, and is an optical multilayer film mirror formed by laminating a plurality of optical layers.

The second optical member 113 is an optical member provided on the first optical member 112 through the gap forming spacer 115 or the like, and is an optical multilayer film mirror formed by laminating a plurality of optical layers.

A part of the second optical member 113 faces the first optical member 112 through the air gap G. When the variable wavelength interference filter 11 is viewed in the lamination direction Z of the optical layers, a portion overlapping with the formation position of the air gap G is an interference region Ar1 in which incident light interferes due to multiple reflections. Transmission light of a wavelength according to the gap dimension of the air gap G is transmitted through the interference region Ar1 and is output from the spectroscopic unit 10.

Figure 2:
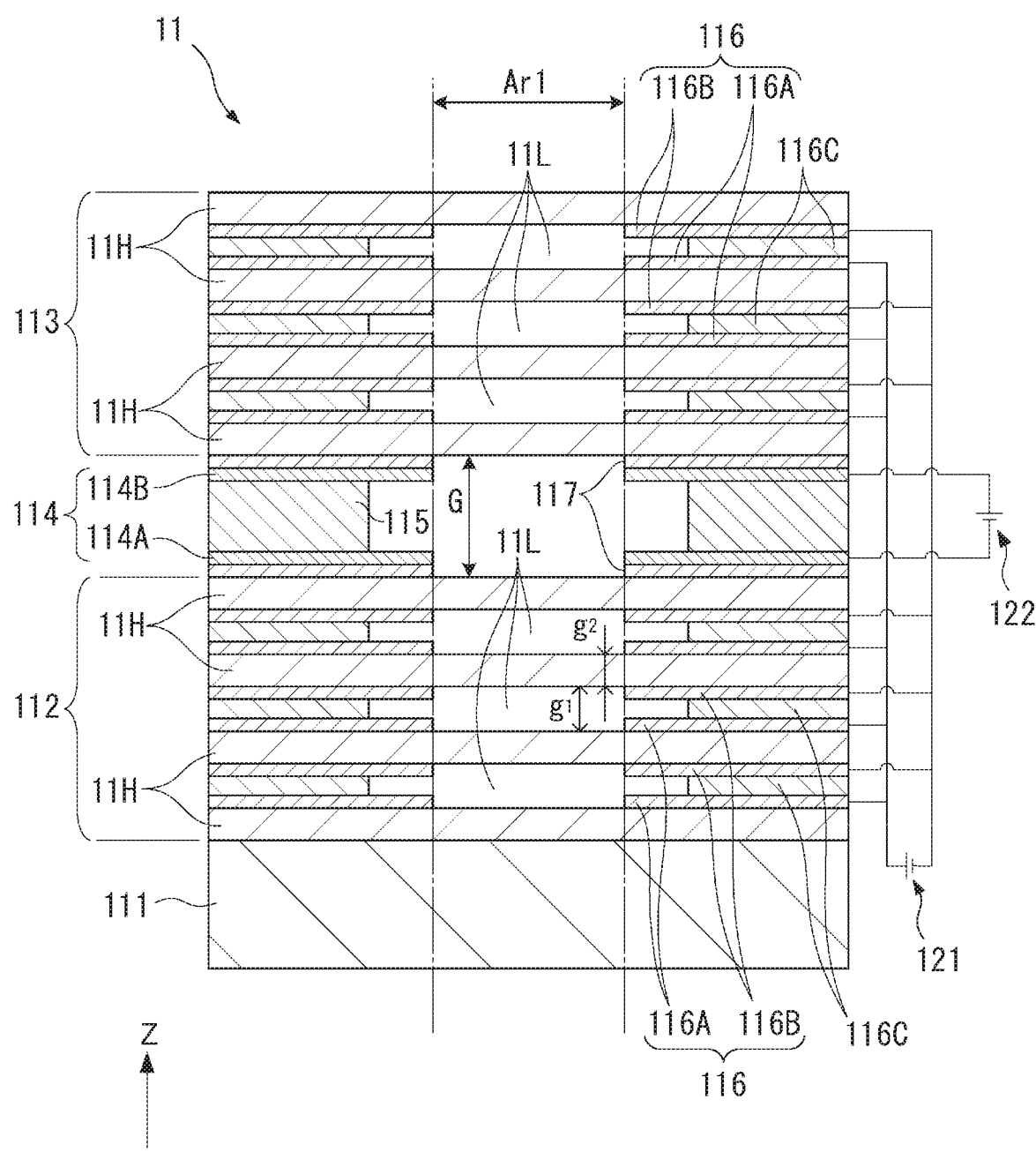
FIG. 2 is a diagram showing a schematic configuration of a first optical member and a second optical member according to the first embodiment.

FIG. 2 is a diagram showing a schematic configuration of the first optical member 112 and the second optical member 113.

As shown in FIG. 2, each of the first optical member 112 and the second optical member 113 includes a plurality of first optical layers 11L and a plurality of second optical layers 11H, and a first optical layer 11L and second optical layer 11H are configured to be alternately laminated along the lamination direction Z of the optical layers.

The first optical layer 11L is a fluid layer including a fluid, and for example, in the present embodiment, is an air layer using air as the fluid.

The second optical layer 11H includes a solid material having a refractive index greater than that of the first optical layer 11L, and $TiO_2$, $Ta_2O_5$, Si, Ge or the like may be used, for example.

In order to vary the light transmitted through the variable wavelength interference filter 11 in a wide bandwidth, a ratio of the refractive indices of the first optical layer 11L to the refractive index of the second optical layer 11H is increased. As a result, in the reflectance characteristics of the first optical member 112 and the second optical member 113, the wavelength bandwidth representing a predetermined reflectance or more is widened, and variable wavelength bandwidth Δλ of the spectroscopic unit 10 is also widened. In the present embodiment, the air layer is used as the first optical layer 11L. In this case, the ratio of the refractive index of the first optical layer 11L to the refractive index of the second optical layer 11H is larger as compared with when a solid material is used, such as $SiO_2$ as the first optical layer 11L, for example. Therefore, the variable wavelength bandwidth Δλ of the spectroscopic unit 10 is widened as compared with when solid materials, such as $SiO_2$, are used as the first optical layer 11L.

Further, in the present embodiment, a pair of electrodes 116A and 116B are provided with each of the first optical layers 11L interposed therebetween and formed of a conductive thin film such as ITO, for example.

For example, as shown in FIG. 2, when both ends of the first optical member 112 in the lamination direction Z are the second optical layer 11H, and both ends of the second optical member 113 in the lamination direction Z are the second optical layer 11H, a first electrode 116A is provided on the surface of the second optical layer 11H in contact with the first optical layer 11L on the side closer to the substrate 111 than the first optical layer 11L. In addition, a second electrode 116B is provided on the surface of the second optical layer 11H, which is in contact with the first optical layer 11L on the side further away from the substrate 111 than the first optical layer 11L.

In a cross-sectional view of the variable wavelength interference filter 11 along the lamination direction Z as shown in FIG. 2, the first electrode 116A and the second electrode 116B are disposed to surround the interference region Ar1 at a position not overlapping the interference region Ar1.

Further, a spacer 116C formed of a thin film such as $SiO_2$ is provided between the first electrode 116A and the second electrode 116B, for example. The spacer 116C is disposed to surround the interference region Ar1 at a position not overlapping the interference region Ar1 in a cross-sectional view as shown in FIG. 2. At this time, the end on the interference region Ar1 side of the spacer 116C is located further away from the interference region Ar1 than the end on the interference region Ar1 side of the first electrode 116A and the second electrode 116B. Therefore, in the first electrode 116A and the second electrode 116B, portions not in contact with the spacer 116C face each other through the air of the first optical layer 11L in the lamination direction Z. Therefore, when a voltage is applied between the first electrode 116A and the second electrode 116B, the layer thickness of the first optical layer 11L in the interference region Ar1 is decreased due to an electrostatic attraction. That is, the first electrode 116A and the second electrode 116B serve as a mirror actuator 116 that changes the layer thickness of the first optical layer 11L.

In the present embodiment, one mirror actuator 116 is provided with respect to each of the first optical layers 11L, respectively. That is, the mirror actuators 116 are disposed by the number of the first optical layers 11L.

By the way, when designing an optical multilayer film mirror in which low refractive layers and high refractive layers are alternately laminated, the layer thickness of each layer is set such that the product (optical thickness) of the layer thickness and the refractive index of each layer is ¼ of the wavelength reflected from the optical multilayer film mirror. In addition, when the light transmitted through the variable wavelength interference filter is changed to a predetermined variable wavelength bandwidth $\Delta\lambda$, the layer thickness of each layer is set such that the optical thickness of each layer is ¼ times of central wavelength $\lambda_0$ in the variable wavelength bandwidth $\Delta\lambda$.

Likewise, in the present embodiment, the layer thickness $g_2$ of the second optical layer 11H is set such that the optical thickness is ¼ of the central wavelength $\lambda_0$ in the variable wavelength bandwidth $\Delta\lambda$. That is, when the refractive index of the second optical layer 11H is $n_L$, the optical thickness $n_L g_2$ of the second optical layer 11H meets $n_L g_2 = \lambda_0/4$.

On the other hand, in the present embodiment, when the voltage is not applied between the first electrode 116A and the second electrode 116B, the layer thickness $g_1$ of the first optical layer 11L is set such that the optical thickness is larger than ¼ times of the central wavelength $\lambda_0$ in the variable wavelength bandwidth $\Delta\lambda$. Moreover, when the longest wavelength of the variable wavelength bandwidth $\Delta\lambda$ of the spectroscopic unit 10 is $\lambda_M$, the layer thickness (initial layer thickness) of the first optical layer 11L when a voltage is not applied between the first electrode 116A and the second electrode 116B is $g_{10}$, and refractive index $n_{air}$ of air is approximated to 1, an initial layer thickness $g_{10}$ may meet $g_{10} > \lambda_M/4$. In addition, when a maximum voltage is applied between the first electrode 116A and the second electrode 116B, the optical thickness of the first optical layer 11L is set to be smaller than ¼ times of the central wavelength $\lambda_0$ in the variable wavelength bandwidth $\Delta\lambda$. More specifically, when the shortest wavelength of the variable wavelength bandwidth $\Delta\lambda$ of the spectroscopic unit 10 is $\lambda_m$, and the layer thickness of the first optical layer 11L when the maximum voltage is applied between the first electrode 116A and the second electrode 116B is $g_{11}$, the layer thickness $g_{11}$ meets $g_{11} < \lambda_m/4$.

The first optical layer 11L may be a sealed space surrounded by the second optical layer 11H, the first electrode 116A, the second electrode 116B, and the spacer 116C, and may have a configuration in which the inside and outside of the first optical layer 11L are communicated with each other by a communication portion. For a configuration for providing the communication portion, a plurality of spacers 116C are disposed at intervals to surround the interference region Ar1, for example. In this case, the communication portion is configured by the adjacent spacers 116C. In addition, a through hole may be provided in the spacer 116C, and the through hole may serve as the communication portion.

When the first optical layer 11L has a sealed structure, when a voltage is applied to the mirror actuator 116, the air in the first optical layer 11L is compressed to reduce the volume and change the layer thickness $g_1$ of the first optical layer 11L. In a configuration in which the communication portion is provided, when a voltage is applied to the mirror actuator 116, the air of the first optical layer 11L escapes to the outside to reduce the volume and change the layer thickness $g_1$ of the first optical layer 11L.

Next, the gap changing unit 114 and the gap forming spacer 115 will be described.

The gap changing unit 114 changes the gap dimension of the air gap G between the first optical member 112 and the second optical member 113. Specifically, the gap changing unit 114 includes a third electrode 114A provided to the first optical member 112 and a fourth electrode 114B provided to the second optical member 113.

The third electrode 114A is provided on the surface of the first optical member 112 facing the second optical member 113, and is disposed to surround the interference region Ar1 in a cross-sectional view along the lamination direction Z.

The fourth electrode 114B is provided on the surface of the second optical member 113 facing the first optical member 112, and is disposed to surround the interference region Ar1 in a cross-sectional view along the lamination direction Z, and faces the third electrode 114A.

As shown in FIG. 2, the third electrode 114A may be provided on the first optical member 112 through an optical thin film 117 such as $SiO_2$. Likewise, the fourth electrode 114B may be provided on the second optical member 113 through an optical thin film 117 such as $SiO_2$.

The gap forming spacer 115 is disposed between the third electrode 114A and the fourth electrode 114B to surround the interference region Ar1 at a position not overlapping the interference region Ar1, as shown in FIGS. 1 and 2. The end of the gap forming spacer 115 on the interference region Ar1 side is located away from the interference region Ar1 than the end of the third electrode 114A and the fourth electrode 114B on the interference region Ar1 side. Therefore, portions of the third electrode 114A and the fourth electrode 114B, not in contact with the gap forming spacer 115 face each other in the lamination direction Z through the air gap G of the first optical layer 11L.

In such the gap changing unit 114, when a voltage is applied between the third electrode 114A and the fourth electrode 114B, the gap dimension of the air gap G is changed by the electrostatic attraction. As a result, the wavelength of the light transmitted through the variable wavelength interference filter 11 is also changed.

Configuration of Driving Circuit 12

Returning to FIG. 1, the driving circuit 12 will be described. As shown in FIG. 1, the driving circuit 12 includes a mirror driving driver 121 and a filter driving driver 122.

The mirror driving driver 121 serves as a layer thickness changing unit, is coupled to the first electrode 116A and the second electrode 116B of the variable wavelength interference filter 11, and applies a mirror driving voltage between the first electrode 116A and the second electrode 116B. In addition, the mirror driving driver 121 changes the electrostatic attraction acting between the first electrode 116A and the second electrode 116B by changing the mirror driving voltage based on a command signal input from the control unit 20 to change the layer thickness $g_1$ of the first optical layer 11L which is an air layer.

Further, in the present embodiment, all first electrodes 116A are wired and coupled to the mirror driving driver 121, and all second electrodes 116B are wired and coupled to the mirror driving driver 121, which are provided in the variable wavelength interference filter 11. As a result, the mirror driving driver 121 may apply the same voltage to each mirror actuator 116, and may control the layer thickness $g_1$ of each of the first optical layers 11L to the same thickness.

The filter driving driver 122 is coupled to the third electrode 114A and the fourth electrode 114B of the variable wavelength interference filter 11, and applies a filter driving voltage between the third electrode 114A and the fourth electrode 114B.

The driving circuit 12 is driven based on the command signal input from the control unit 20. This command signal includes a command value of a mirror driving voltage for setting the layer thickness $g_1$ corresponding to the light of the target wavelength, and a filter driving voltage for setting the gap dimension of the air gap G for transmitting the light of the target wavelength.

As a result, the mirror driving driver 121 applies the mirror driving voltage to the mirror actuator 116 according to the command value of the mirror driving voltage included in the command signal, and changes the layer thickness $g_1$ of the first optical layer 11L to be ¼ times of the target wavelength.

Further, the filter driving driver 122 applies the filter driving voltage to the gap changing unit 114 according to the command value of the filter driving voltage included in the command signal, and changes the gap dimension of the air gap G to a dimension for transmitting light at the target wavelength.

Configuration of Control Unit 20

The control unit 20 is a controller that controls the overall operation of the spectroscopic device 1. As shown in FIG. 1, the control unit 20 includes a memory 21 and a spectral control unit 22. The control unit 20 also includes an interface (not shown) that connects the spectroscopic device 1 to an external device, and may also receive a signal from the external device. For example, a signal or the like for specifying a target wavelength of light to be dispersed by the spectroscopic device 1 may be illustrated as a signal from an external device. The spectroscopic device 1 may be configured to have an operation unit that receives an operation input by the user.

The memory 21 stores various data for driving the spectroscopic unit 10. Specifically, the memory 21 stores a driving table indicating the filter driving voltage and the mirror driving voltage with respect to the wavelength of light transmitted through the spectroscopic unit 10.

The spectral control unit 22 controls the spectroscopic unit 10 to change the wavelength of the transmission light to be transmitted through the spectroscopic unit 10.

For example, when the wavelength of light to be dispersed by the spectroscopic unit 10 is input from an external device or an operation unit, the spectral control unit 22 sets the wavelength as a target wavelength. Then, the spectral control unit 22 reads the mirror driving voltage and the filter driving voltage for the target wavelength from the driving table stored in the memory 21, and outputs a command signal to the driving circuit 12.

Method of Driving Spectroscopic Device 1

Next, a method of driving the spectroscopic device 1 as described above will be described.

Figure 3:
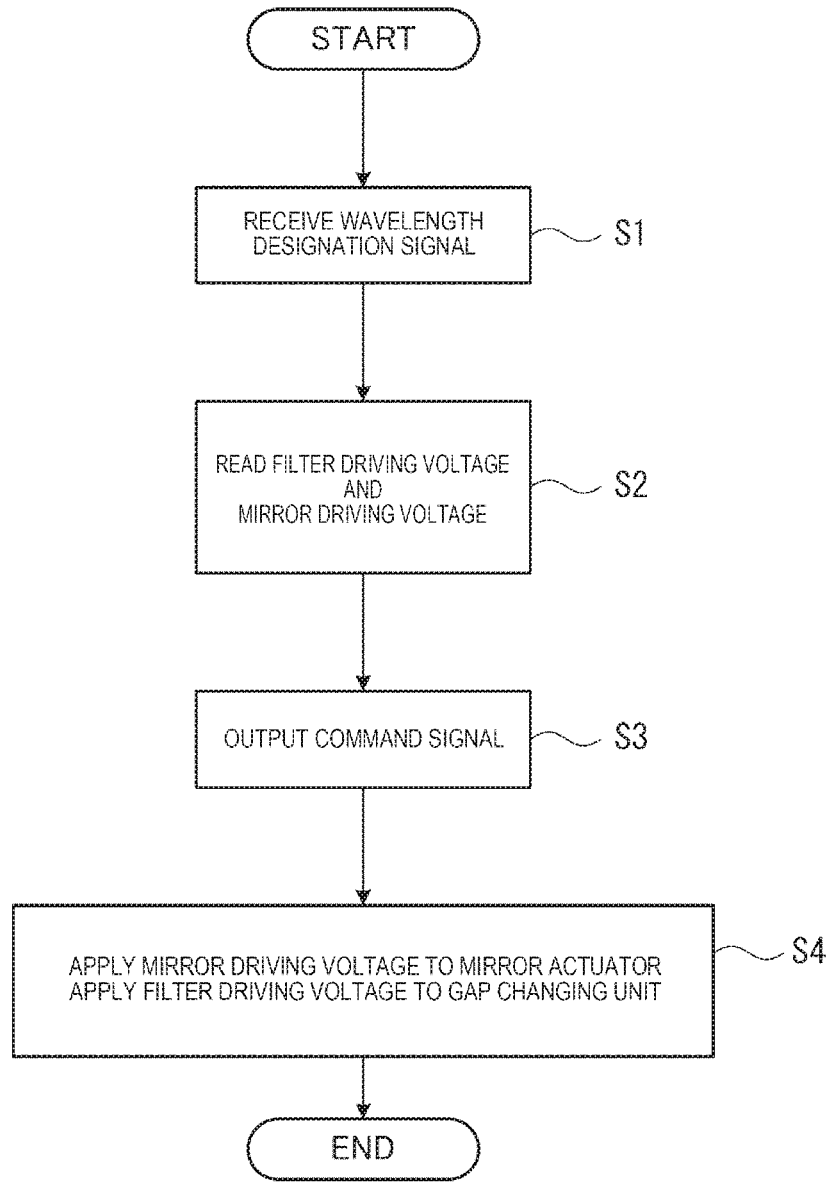
FIG. 3 is a flowchart showing a method of driving the spectroscopic device according to the first embodiment.

FIG. 3 is a flowchart showing a method of driving the spectroscopic device 1.

In this example, as an example of driving the spectroscopic device 1, an example is shown in which the wavelength of the light to be dispersed by the spectroscopic unit 10 is changed by inputting an input signal indicating that light of a predetermined wavelength is to be dispersed to the spectroscopic device 1 from the external device (not shown).

As shown in FIG. 3, the control unit 20 receives, from the external device, a wavelength designation signal indicating that the target wavelength λi to be transmitted through the spectroscopic unit 10 is designated (step S1).

Next, the spectral control unit 22 reads the filter driving voltage and the mirror driving voltage corresponding to the target wavelength λi from the driving table recorded in the memory 21 (step S2). Then, the spectral control unit 22 outputs a command signal including the filter driving voltage and the mirror driving voltage to the driving circuit 12 (step S3).

When the command signal is input to the driving circuit 12, the mirror driving driver 121 applies the mirror driving voltage to each mirror actuator 116, and the filter driving driver 122 applies the filter driving voltage to the gap changing unit 114 (step S4).

As a result, the layer thickness $g_1$ of the first optical layer 11L constituting the first optical member 112 and the second optical member 113 of the variable wavelength interference filter 11 is changed to be λi/4. Therefore, the variable wavelength interference filter 11 may transmit the light of the target wavelength λi with a narrow half value width, and may transmit the light of the target wavelength with a high resolution.

Spectroscopic Measurement of Spectroscopic Device 1

Next, the spectral characteristics of the variable wavelength interference filter 11 in the spectroscopic device 1 according to the present embodiment will be described with reference to a related variable wavelength interference filter as a comparative example.

Figure 4:
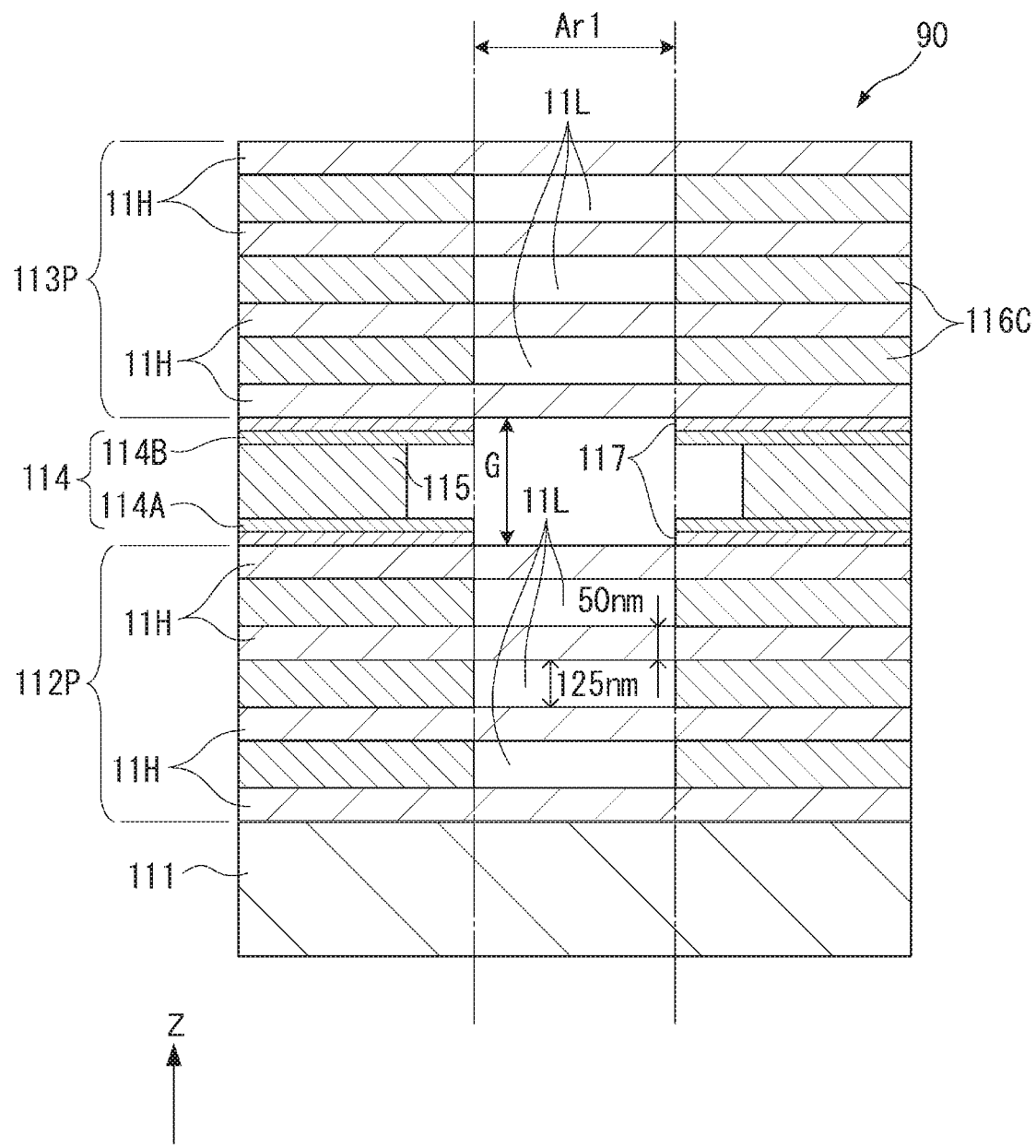
FIG. 4 is a diagram showing a mirror structure of a related variable wavelength interference filter as a comparative example.

FIG. 4 is a diagram showing a mirror structure of a variable wavelength interference filter 90 of the comparative example.

As shown in FIG. 4, the variable wavelength interference filter 90 according to the comparative example includes a first optical member 112P and a second optical member 113P in which the first optical layer 11L which is an air layer and the second optical layer 11H formed of a solid material such as $TiO_2$ are laminated. Here, the variable wavelength interference filter 90 according to the comparative example is a filter designed to have a visible light range from 400 nm to 700 nm as the variable wavelength bandwidth Δλ, and includes the first optical layer 11L and the second optical layer 11H having the layer thicknesses set with respect to the central wavelength $\lambda_0$ being $\lambda_0$=550 nm. That is, in the comparative example, the layer thickness $g_1$ of the first optical layer 11L is fixed at 125 nm regardless of the wavelength of light transmitted through the spectroscopic unit 10.

Figure 5:
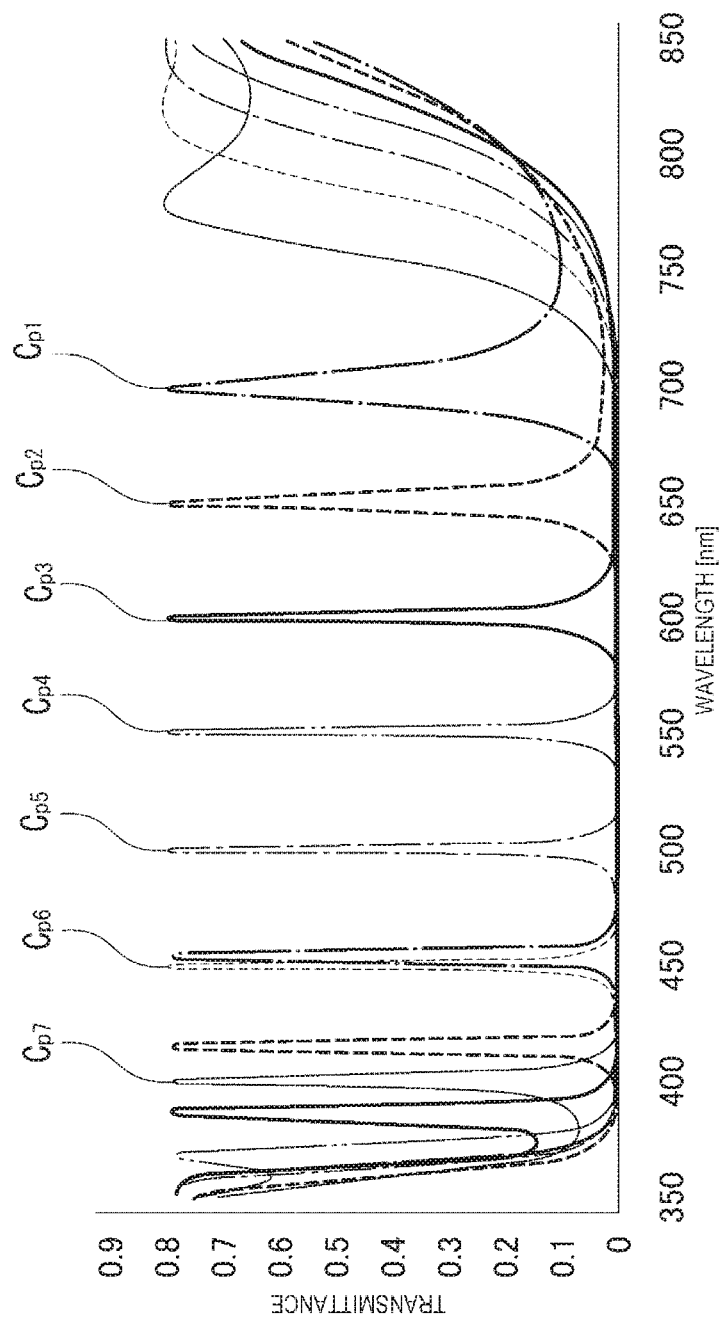
FIG. 5 is a graph showing a spectral characteristics of the variable wavelength interference filter according to the comparative example.

FIG. 5 is a diagram showing the spectral characteristics of the variable wavelength interference filter 90 of the comparative example. In addition, FIG. 5 shows respective spectral characteristics when the gap dimension of the air gap G is sequentially changed. That is, $C_{P1}$ is a spectral characteristics when light of 700 nm is transmitted through the variable wavelength interference filter 90. $C_{P2}$ is a spectral characteristics when light of 650 nm is transmitted through the variable wavelength interference filter 90. $C_{P3}$ is a spectral characteristics when light of 600 nm is transmitted through the variable wavelength interference filter 90. $C_{P4}$ is a spectral characteristics when light of 550 nm is transmitted through the variable wavelength interference filter 90. $P_{P5}$ is a spectral characteristics when light of 500 nm is transmitted through the variable wavelength interference filter 90. $C_{P6}$ is a spectral characteristics when light of 450 nm is transmitted through the variable wavelength interference filter 90. $C_{P7}$ is a spectral characteristics when light of 400 nm is transmitted through the variable wavelength interference filter 90.

In the variable wavelength interference filter 90 according to the comparative example, when the gap dimension of the air gap G is changed to transmit light of the central wavelength $\lambda_0$, the transmission light including wavelength components within a narrow range centered on the central wavelength $\lambda_0$, as shown in $C_{P4}$ is transmitted through the variable wavelength interference filter 90. That is, it is possible to narrow the half value width in the spectral characteristics of the transmission light and to transmit the light of the target wavelength with a high resolution.

However, when transmitting the wavelength that is away from the central wavelength $\lambda_0$, for example, when transmitting the light of the shortest wavelength $\lambda_m$ (=400 nm) and the longest wavelength $\lambda_M$ (=700 nm) of the variable wavelength bandwidth $\Delta\lambda$, the half value width is larger than $C_{P4}$ and the resolution is reduced, as shown in $C_{P1}$ and $C_{P7}$.

Figure 6:
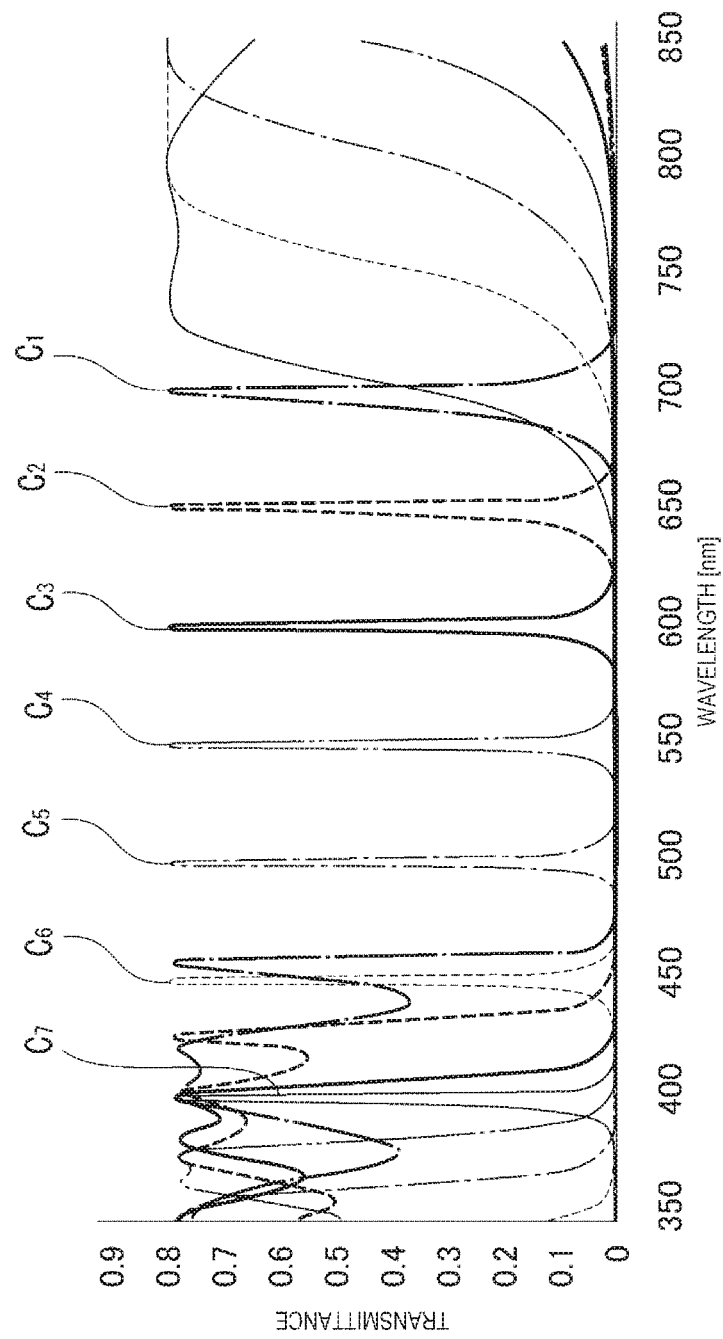
FIG. 6 is a diagram showing a spectral characteristics of a variable wavelength interference filter according to the first embodiment.

FIG. 6 is a diagram showing the spectral characteristics of the variable wavelength interference filter 11 in the present embodiment. In addition, FIG. 6 shows respective spectral characteristics when the gap dimension of the air gap G is sequentially changed. That is, $C_1$ is a spectral characteristics when light of 700 nm is transmitted through the variable wavelength interference filter 11. $C_2$ is a spectral characteristics when the light of 650 nm is transmitted through the variable wavelength interference filter 11. $C_3$ is a spectral characteristics when the light of 600 nm is transmitted through the variable wavelength interference filter 11. $C_4$ is a spectral characteristics when the light of 550 nm is transmitted through the variable wavelength interference filter 11. $C_5$ is a spectral characteristics when the light of 500 nm is transmitted through the variable wavelength interference filter 11. $C_6$ is a spectral characteristics when the light of 450 nm is transmitted through the variable wavelength interference filter 11. $C_7$ is a spectral characteristics when the light of 400 nm is transmitted through the variable wavelength interference filter 11.

Figure 7:
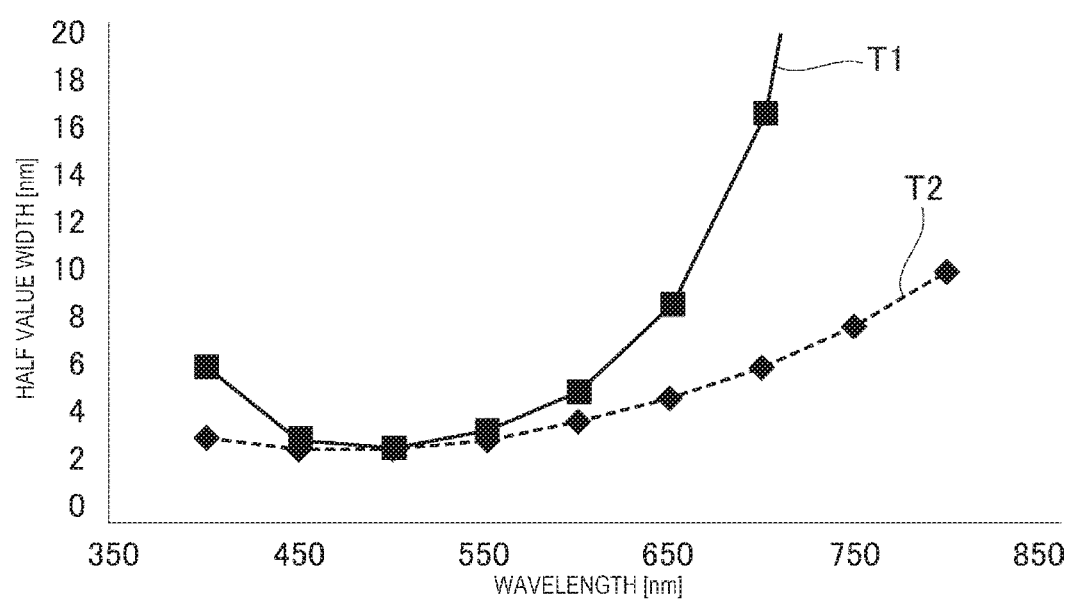
FIG. 7 is a diagram comparing the spectral characteristics of the variable wavelength interference filter according to the first embodiment and the variable wavelength interference filter of the comparative example.

In addition, FIG. 7 is a diagram comparing spectral characteristics of the variable wavelength interference filter 11 according to the present embodiment and the variable wavelength interference filter 90 according to the comparative example, and shows the change of the half value width in the spectral characteristics of the transmission light when the target wavelength is changed. In FIG. 7, T1 is a characteristic curve which shows the change of the half value width according to the comparative example, T2 is a characteristic curve which shows the change of the half value width according to the present embodiment.

In the variable wavelength interference filter 11 according to the present embodiment, even when the target wavelength is away from the central wavelength $\lambda_0$, a mirror driving voltage according to the target wavelength is applied to the mirror actuator 116. Therefore, the reflectance characteristics of the first optical member 112 and the second optical member 113 are optimized for the target wavelength.

That is, in the present embodiment, in a state in which a voltage is not applied to the mirror actuator 116, the first optical member 112 and the second optical member 113 have reflectance characteristics such that the reflectance is equal to or higher than a threshold value with respect to light within a predetermined wavelength range centered on the longest wavelength $\lambda_M$. Then, when the target wavelength is changed, the layer thickness $g_1$ of the first optical layer 11L is changed according to the target wavelength, so the central wavelength in the reflectance characteristics of the first optical member 112 and the second optical member 113 is shifted to the short wavelength side, and the wavelength range with the reflectance equal to or higher than the threshold value is also shifted to the short wavelength side.

Therefore, as shown in FIGS. 6 and 7, in the variable wavelength interference filter 11 according to the present embodiment, even when transmitting light of a wavelength that is away from the central wavelength $\lambda_0$ of the variable wavelength bandwidth $\Delta\lambda$, the half value width in the spectral characteristics of the transmission light may be narrowed, and light may be transmitted with a high resolution as compared with the variable wavelength interference filter 90 according to the comparative example.

Operation and Effect of the Present Embodiment

The spectroscopic device 1 according to the present embodiment includes the spectroscopic unit 10 provided with the variable wavelength interference filter 11 and the driving circuit 12, and the control unit 20.

The variable wavelength interference filter 11 constituting the spectroscopic unit 10 includes the first optical member 112, the second optical member 113, and the gap changing unit 114 that changes a gap dimension of the air gap G between the first optical member 112 and the second optical member 113.

The first optical member 112 and the second optical member 113 include a plurality of the first optical layers 11L and a plurality of second optical layers 11H having a refractive index different from that of the first optical layers 11L, and are configured by laminating the first optical layer 11L and the second optical layer 11H.

Further, the driving circuit 12 constituting the spectroscopic unit 10 includes the mirror driving driver 121 that serves as a layer thickness changing unit, and the mirror driving driver 121 changes the layer thickness $g_1$ of the first optical layer 11L.

Therefore, in the present embodiment, the optical characteristics (reflectance characteristics) of the first optical member 112 and the second optical member 113 may be changed by changing the layer thickness $g_1$ of the first optical layer 11L. That is, by changing the layer thickness $g_1$, it is possible to shift the central wavelength of the reflectance characteristics of the first optical member 112 and the second optical member 113 closer to the target wavelength. As a result, when the light of the target wavelength is transmitted through the variable wavelength interference filter 11, the half value width in the spectral characteristics of the transmission light may be narrowed, and the light of the target wavelength may be transmitted with a high resolution.

In addition, the central wavelength in the reflectance characteristics of the first optical member 112 and the second optical member 113 may be shifted by changing the layer thickness $g_1$ of the first optical layer 11L, so that the wavelength range of light that may be reflected by the first optical member 112 and the second optical members 113 is widened. Thus, the variable wavelength bandwidth $\Delta\lambda$ of the variable wavelength interference filter 11 may be widened.

Furthermore, in the spectroscopic device 1 including such the spectroscopic unit 10, the wavelength of light to be transmitted by the spectroscopic unit 10 may be easily controlled by outputting a command signal to the spectroscopic unit 10 by the control unit 20, and the light of the target wavelength may be emitted with a high resolution by the spectroscopic device 1.

In the variable wavelength interference filter 11 according to the present embodiment, the first optical layer 11L is an air layer (fluid layer), the first electrode 116A and the second electrode 116B are disposed with the first optical layer 11L interposed therebetween, and the mirror actuator 116 is formed with the first electrode 116A and the second electrode 116B. Then, the mirror driving driver 121 changes the layer thickness $g_1$ of the first optical layer 11L by changing the mirror driving voltage applied to the mirror actuator 116 provided in each of the first optical layers 11L.

That is, among the pair of second optical layers 11H with the first optical layer 11L interposed therebetween, the first electrode 116A is provided on one of the second optical layers 11H disposed on the substrate 111 side. In addition, of the pair of second optical layers 11H, the second electrode 116B is provided on the second optical layer 11H disposed on the other side opposite to the substrate 111.

In such a configuration, when the mirror driving voltage to the mirror actuator 116 is controlled, the second optical layer 11H with the first electrode 116A bonded thereto and the second optical layer 11H with the second electrode 116B bonded thereto are stressed in a direction closer to each other by electrostatic attraction. Further, since the first optical layer 11L includes air (fluid), the second optical layers 11H with the first optical layer 11L interposed therebetween are easily displaced in the direction closer toward each other. Thereby, the layer thickness $g_1$ of the first optical layer 11L may be easily changed.

At this time, in the present embodiment, the filter driving driver 122 applies a filter driving voltage corresponding to the target wavelength to the gap changing unit 114, and the mirror driving driver 121 applies a mirror driving voltage corresponding to the target wavelength to the mirror actuator 116. That is, the gap changing unit 114 changes the gap dimension of the air gap G to a dimension for transmitting light of the target wavelength by applying a filter driving voltage corresponding to the target wavelength. As a result, the light of the target wavelength is transmitted through the variable wavelength interference filter 11.

In addition, a mirror driving voltage is applied to the mirror actuator 116, resulting in the layer thickness $g_1$ of the first optical layer 11L corresponding to ¼ times of the target wavelength. Thereby, the reflectance characteristics of the first optical member 112 and the second optical member 113 may be shifted to the target wavelength side.

Therefore, it is possible to output light having a narrow half value width centered on the light of the target wavelength through the variable wavelength interference filter 11.

Second Embodiment

Next, a second embodiment will be described.

In the first embodiment, the first electrode 116A and the second electrode 116B are disposed for each of the first optical layers 11L to change the layer thickness $g_1$ of the first optical layer 11L. On the other hand, the present embodiment is different from the first embodiment in that the layer thickness $g_1$ of the first optical layer 11L is changed by using the second optical layer 11H as an electrode.

In the following description, the same components will be denoted by the same reference numerals, and the description thereof will not be repeated or will be simplified.

Figure 8:
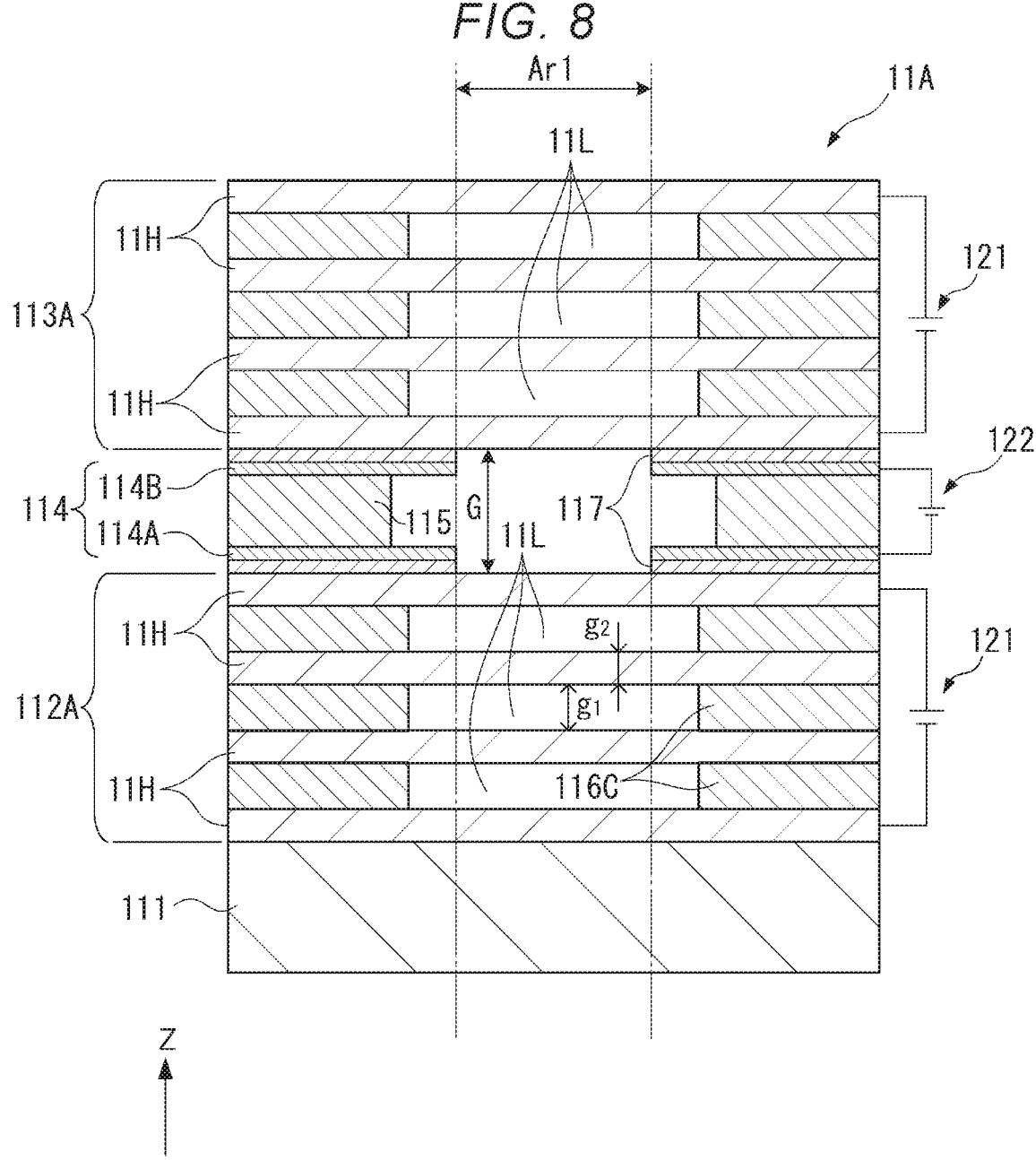
FIG. 8 is a diagram showing a schematic configuration of a first optical member and a second optical member of a variable wavelength interference filter according to the second embodiment.

FIG. 8 is a diagram showing a mirror configuration of a variable wavelength interference filter 11A according to the second embodiment, that is, a schematic configuration of a first optical member 112A and a second optical member 113A.

In the present embodiment, the variable wavelength interference filter 11 shown in FIG. 2 is changed to the variable wavelength interference filter 11A shown in FIG. 8 in the spectroscopic unit 10 according to the first embodiment.

As shown in FIG. 8, in the variable wavelength interference filter 11A, likewise the first embodiment, the first optical member 112A is provided on the substrate 111, and the second optical member 113A is disposed to face the first optical member 112A via the air gap G.

Likewise the first embodiment, each of the first optical member 112A and the second optical member 113A includes a plurality of the first optical layers 11L and a plurality of second optical layers 11H, and the first optical layer 11L and the second optical layer 11H are configured to be alternately laminated along the lamination direction Z of the optical layers.

Here, in the present embodiment, the second optical layer 11H has conductivity. For such a second optical layer 11H, a solid material having conductivity, such as ITO, Si, Ge or the like may be used. In addition, the optical material such as $TiO_2$ may be doped with, Nb or Ta to have the conductivity, for example.

In the present embodiment, the spacer 116C is disposed directly between the plurality of second optical layers 11H, so that the first optical layer 11L having an initial layer thickness $g_{10}$ corresponding to the thickness of the spacer 116C is formed therebetween.

Further, in the present embodiment, the second optical layers 11H are disposed at both ends of the first optical member 112A in the lamination direction Z, and the second optical layers 11H disposed at the both ends thereof in the lamination direction Z are electrically coupled to the mirror driving driver 121.

Likewise, the second optical layers 11H are disposed at both ends of the second optical member 113A in the lamination direction Z, and the second optical layers 11H disposed at the both ends thereof in the lamination direction Z are electrically coupled to the mirror driving driver 121.

In such a configuration, each of the second optical layers 11H serves as a capacitor electrically coupled in series, and when a mirror driving voltage is applied by the mirror driving driver 121, a charge is retained in each capacitor. At this time, since the amount of charge retained in each capacitor is the same, the electrostatic attraction causes displacement between the respective second optical layers 11H by the same amount, and the layer thickness $g_1$ of the first optical layer 11L may be uniformly changed to the desired dimension.

Operation and Effect of the Present Embodiment

In the present embodiment, each of the first optical member 112A and the second optical member 113A is configured by alternately laminating the first optical layer 11L, which is an air layer (fluid layer), and the second optical layer 11H, which has conductivity, in the lamination direction Z. Then, the mirror driving driver 121 applies a mirror driving voltage between the two second optical layers 11H disposed at the both ends of the first optical member 112A in the lamination direction Z.

In such a configuration, the plurality of second optical layers 11H disposed in the first optical member 112A are parallel flat plates disposed through the first optical layer 11L, which is an air layer, and serve as a plurality of capacitors electrically coupled in series. Since the amounts of charge retained in these capacitors are equal to each other, the layer thickness $g_1$ of the first optical layer 11L is maintained at the same dimension. In addition, the electrostatic attraction according to the mirror driving voltage is also the same in each capacitor, so that the layer thickness $g_1$ of the first optical layer 11L may be changed by the same amount.

Therefore, as in the first embodiment, in the present embodiment, it is possible to adjust the layer thickness $g_1$ of each of the first optical layers 11L to a dimension corresponding to the target wavelength, and control the layer thickness $g_1$ of each of the first optical layers 11L to the same dimension with a high accuracy by a simple configuration.

Third Embodiment

Next, the third embodiment will be described. In the first and second embodiments, it is illustrated as an example that the layer thickness $g_1$ of the first optical layer 11L which is the fluid layer is changed. On the other hand, the third embodiment is different from the first embodiment and the second embodiment in that the optical thickness is changed by changing the refractive index of the optical layer constituting the optical member.

Figure 9:
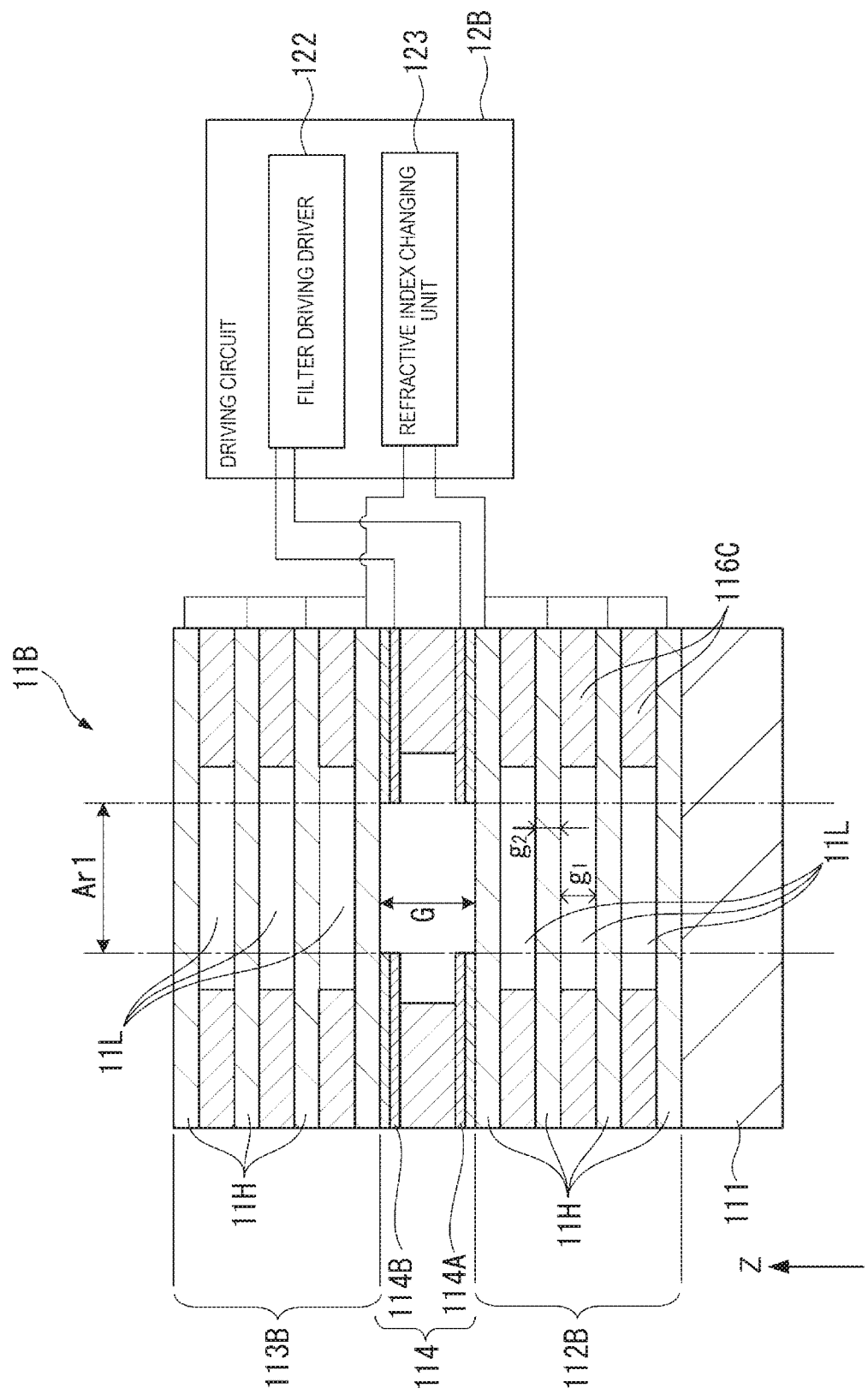
FIG. 9 is a diagram showing a schematic configuration of a first optical member and a second optical member of a variable wavelength interference filter according to the third embodiment.

FIG. 9 is a diagram showing a schematic configuration of a first optical member 112B and a second optical member 113B of a variable wavelength interference filter 11B of the third embodiment.

As shown in FIG. 9, in the variable wavelength interference filter 11B according to the present embodiment, the first optical member 112B is provided on the substrate 111, and the second optical member 113B is disposed to face the first optical member 112B through the air gap G.

The first optical member 112B and the second optical member 113B include a plurality of the first optical layers 11L and a plurality of second optical layers 11H, and the first optical layer 11L and the second optical layer 11H are configured to be alternately laminated along the lamination direction Z of the optical layers.

In the present embodiment, the second optical layer 11H is an electro-optical crystal formed of a liquid crystal cell or the like, for example, and the refractive index is changed by applying a voltage. That is, in the present embodiment, the layer thickness $g_2$ of the second optical layer 11H is fixed, and the optical thickness $n_L g_2$ of the second optical layer 11H is controlled to be ¼ times of the target wavelength by changing refractive index $n_L$ of the second optical layer 11H.

In the present embodiment, the driving circuit 12B includes a refractive index changing unit 123. The refractive index changing unit 123 is coupled to each of the second optical layers 11H, and changes the voltage (refractive index control voltage) applied to each of the second optical layers 11H.

Furthermore, in the present embodiment, the memory 21 of the control unit 20 records, as a driving table, a target wavelength, a filter driving voltage corresponding to the target wavelength, and the refractive index control voltage applied to the second optical layer 11H for setting the optical thickness $n_L g_2$ of the second optical layer 11H to ¼ of the target wavelength. Therefore, for example, when receiving a wavelength designation signal for designating a target wavelength from an external device or the like, the spectral control unit 22 reads the filter driving voltage and the refractive index control voltage corresponding to the target wavelength from the driving table and outputs a command signal to the driving circuit 12B. As a result, the filter driving driver 122 of the driving circuit 12B drives the gap changing unit 114 so that the gap dimension of the air gap G is the dimension corresponding to the target wavelength. In addition, the refractive index changing unit 123 of the driving circuit 12B changes the refractive index $n_L$ so that the optical thickness $n_L g_2$ of the second optical layer 11H is ¼ times of the target wavelength.

In the variable wavelength interference filter 11B according to the present embodiment shown in FIG. 9, the mirror actuator 116 is not disposed for each of the first optical layers 11L, and the layer thickness $g_1$ of the first optical layer 11L is constant, but not limited thereto.

For example, as in the first embodiment and the second embodiment, the thickness dimension of the first optical layer 11L may be changeable. At this time, in the present embodiment, when a voltage is applied to the second optical layer 11H, the refractive index of the second optical layer 11H is changed. Therefore, as in the first embodiment, the mirror actuator 116 may be configured such that the first electrode 116A is disposed on one side of the pair of second optical layers 11H with the first optical layer 11L interposed therebetween and the second electrode 116B is disposed on the other side.

In such a configuration, the mirror driving driver 121 of the driving circuit 12 changes the layer thickness $g_1$ of the first optical layer 11L so that the optical thickness of the first optical layer 11L is ¼ of the target wavelength. In addition, the refractive index changing unit 123 changes the refractive index $n_L$ so that the optical thickness $n_L g_2$ of the second optical layer 11H is ¼ times of the target wavelength.

Operation and Effect of the Present Embodiment

The spectroscopic unit 10 according to the present embodiment includes the variable wavelength interference filter 11B and the driving circuit 12B. Then, in the variable wavelength interference filter 11B according to the present embodiment, the first optical member 112 and the second optical member 113 include a plurality of the first optical layers 11L and a plurality of second optical layers 11H, and are formed by laminating the first optical layer 11L and the second optical layer 11H. In addition, the second optical layer 11H includes an electro-optical crystal such as liquid crystal, and the refractive index is changed by an application of voltage.

The driving circuit 12B is provided with the refractive index changing unit 123, and the refractive index changing unit 123 changes the voltage applied to the second optical layer 11H to change the refractive index of the second optical layer 11H.

Further, the gap changing unit 114 is provided to change the gap dimension of the air gap G between the first optical member 112 and the second optical member 113.

Therefore, in the present embodiment, the refractive index $n_L$ of the second optical layer 11H is changed so that the optical thickness $n_L g_2$ of the second optical layer 11H is ¼ times the target wavelength, so that the central wavelength in the reflectance characteristics of the first optical member 112B and the second optical member 113B can be shifted so as to approach the target wavelength.

As a result, when light of the target wavelength is transmitted through the variable wavelength interference filter 11B, the half value width in the spectral characteristics of the transmission light may be narrowed, and light of the desired target wavelength may be transmitted with a high resolution.

Modification

The present disclosure is not limited to the embodiments described above, but variations and improvements within the scope of achieving the object of the present disclosure are included in the present disclosure.

Modification 1

In the first embodiment, as the electronic device, the spectroscopic device 1 that disperses and outputs light of a target wavelength is illustrated, and as the optical device, the spectroscopic unit 10 including the variable wavelength interference filter 11 and the driving circuit 12 is illustrated, but not limited thereto.

For example, the electronic device may be a spectroscopic measurement device that disperses the light from the measurement target by the spectroscopic unit 10 and measures the dispersed light. Such a spectroscopic measurement device may be incorporated into a projector and the like that projects the image light onto a screen such as a printer that prints an image on a print medium, and the like, for example.

Moreover, a configuration is illustrated in which an optical device is the spectroscopic unit 10 and includes the variable wavelength interference filter 11 including the first optical member 112 and the second optical member 113, but not limited thereto. For example, the optical device may be a mirror device that includes one optical member and reflects incident light incident on the optical member in a predetermined direction.

Furthermore, the optical member does not need to be a mirror that reflects light, and may be an antireflective film or a cut filter that cuts light of a predetermined wavelength, for example. That is, in the optical member in which the first optical layer 11L and the second optical layer 11H are alternately laminated, part of the light is reflected and the other light is transmitted. Therefore, it serves as an antireflective film (AR coat) for the transmission wavelength range. Likewise each embodiment described above, the central wavelength and the reflection wavelength range of the reflectance characteristics may be shifted by changing the optical thickness of the first optical layer 11L and the second optical layer 11H, and as a result, it is also possible to shift the anti-reflection wavelength range which prevents reflection by the AR coat.

Modification 2

In the first embodiment, as a method of driving the spectroscopic device 1, the spectroscopic device 1 is driven to transmit light of a target wavelength based on a wavelength designation signal input from an external device or the like.

On the other hand, for example, the control unit may control to sequentially transmit a plurality of wavelengths from the longest wavelength $\lambda_M$ to the shortest wavelength $\lambda_m$ at a predetermined cycle. In this case, the control unit 20 may sequentially input a command signal for each wavelength to the driving circuit 12.

In this case, it is also possible to calculate the spectrum of the measurement light by causing the light receiving unit to receive light of a plurality of wavelengths emitted from the spectroscopic device 1 and measuring the light reception amount for each wavelength.

Modification 3

In the second embodiment, the mirror driving driver 121 applies a mirror driving voltage between the second optical layers 11H located at both ends of the first optical member 112A in the lamination direction Z, and likewise, applies a mirror driving voltage between the second optical layers 11H located at both ends of the second optical member 113A in the lamination direction Z.

Meanwhile, the mirror driving driver 121 may be coupled to the second optical layer 11H located at the closest position to the substrate 111 of the first optical member 112A and to the second optical layer 11H located at the farthest position from the substrate 111 of the second optical member 113A, and may apply a mirror driving voltage between these two second optical layers 11H.

In such a configuration, the gap dimension of the air gap G may be changed by applying the mirror driving voltage. In this case, initial layer thickness $g_{10}$ of the first optical layer 11L is set to be ¼ times of the longest wavelength $\lambda_M$ of the variable wavelength bandwidth $\Delta\lambda$, and a mirror driving voltage is applied so that the gap dimension of the air gap G is the dimension for transmitting the light of the target wavelength. Thus, the air gap G may be changed to a dimension corresponding to the target wavelength, and the layer thickness $g_1$ of the first optical layer 11L may be reduced as the target wavelength decreases. Therefore, the half value width in the spectral characteristics of the transmission light may be decreased, and the resolution may be enhanced as compared with the related variable wavelength interference filter in which the layer thickness of the first optical layer 11L is fixed.

Modification 4

In the third embodiment, the first optical layer 11L is an air layer, but is not limited thereto.

For example, the first optical layer 11L may be an optical layer using a solid material such as $SiO_2$.

Furthermore, both of the first optical layer 11L and the second optical layer 11H may include an electro-optical crystal. In this case, the first optical layer 11L uses an electro-optical crystal that is configured to be changed in the refractive index in a first refractive index range that is equal to or greater than the first refractive index and less than the second refractive index, and the second optical layer 11H uses an electro-optical crystal that is configured to be changed in the refractive index in a second refractive index range that is greater than or equal to a third refractive index greater than the second refractive index and less than a fourth refractive index greater than the second refractive index. Then, the first optical layer 11L and the second optical layer 11H are formed such that the layer thickness $g_1$ of the first optical layer 11L and the layer thickness $g_2$ of the second optical layer 11H meet $g_1 > g_2$.

In this case, the optical thickness may be changed to a value according to the target wavelength in both of the first optical layer 11L and the second optical layer 11H, and the variable wavelength interference filter may transmit light of the target wavelength with a higher resolution.

Modification 5

In the first embodiment and the second embodiment, when changing the layer thickness $g_1$ of the first optical layer 11L, light of wavelengths other than the target wavelength in the variable wavelength bandwidth $\Delta\lambda$ is transmitted through the variable wavelength interference filters 11 and 11A.

Figure 10:
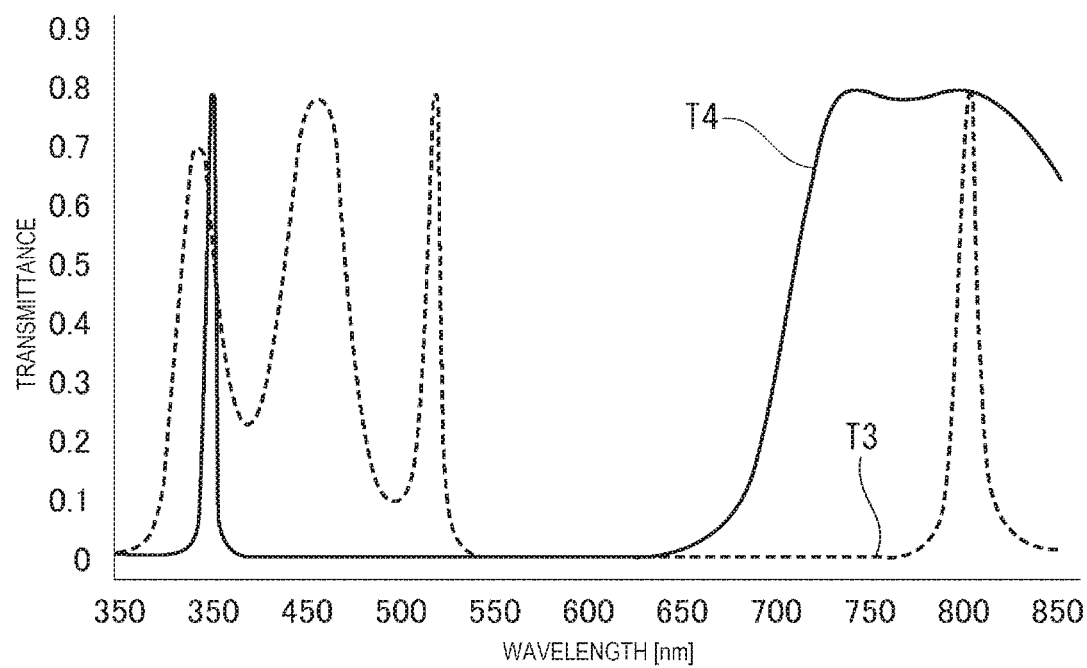
FIG. 10 is a view showing respective spectral characteristics when target wavelengths are set to 800 nm and 400 nm in the variable wavelength interference filter according to the first embodiment.

FIG. 10 is a view showing spectral characteristics when the target wavelength is set to 800 nm and 400 nm, respectively in the variable wavelength interference filter 11 according to the first embodiment. In FIG. 10, T3 is a spectral characteristics with respect to 800 nm, and T4 is a spectral characteristics with respect to 400 nm.

As shown in T3 shown in FIG. 10, when the target wavelength is 800 nm and the layer thickness $g_1$ of the first optical layer 11L and the gap dimension of the air gap G are changed, light with a wavelength of 550 nm or less is also transmitted through the variable wavelength interference filter 11 in addition to the light of the target wavelength of 800 nm through the variable wavelength interference filter 11. In addition, as shown in T4, when the target wavelength is 400 nm and the layer thickness $g_1$ of the first optical layer 11L and the gap dimension of the air gap G are changed, light with a wavelength of 650 nm or more is also transmitted through the variable wavelength interference filter 11 in addition to the light of the target wavelength of 400 nm through the variable wavelength interference filter 11.

Therefore, a cut filter for blocking light in a predetermined wavelength range may be inserted on an optical axis of the variable wavelength interference filter 11 of the spectroscopic unit 10, and the cut filter may be replaced according to the target wavelength.

For example, when light having a target wavelength of 800 nm is to be transmitted through the variable wavelength interference filter 11, a first cut filter for blocking light of 550 nm or less is inserted on the optical axis of the variable wavelength interference filter 11.

In addition, when light having a target wavelength of 400 nm is to be transmitted through the variable wavelength interference filter 11, the first cut filter is retracted from the optical axis of the variable wavelength interference filter 11, and instead, a second cut filter for blocking light of 650 nm or less is inserted.

As a result, it is possible to suppress the trouble arising when the wavelengths other than the target wavelength are emitted from the spectroscopic device 1.

Modification 6

In the first embodiment, an example is illustrated in which the mirror actuators 116 disposed in each of the first optical layers 11L are coupled in parallel and a mirror driving voltage is applied, but not limited thereto. For example, as in the second embodiment, the mirror actuators 116 may be electrically coupled in series. In this case, the first electrode 116A and the second electrode 116B of the adjacent mirror actuator 116 may be electrically coupled to each other, and the first electrode 116A of the mirror actuator 116 disposed at the end on the substrate 111 side and the second electrode 116B of the mirror actuator 116 disposed at the end away from the substrate 111, in the lamination direction Z may be coupled to the mirror driving driver 121.

Modification 7

In the first embodiment and the second embodiment, an example in which the first optical layer 11L is an air layer is illustrated, but not limited thereto. The first optical layer 11L may include a liquid such as water or a gas such as He. As described above, by the first optical layer 11L being configured by the fluid layer, the layer thickness $g_1$ of the first optical layer 11L may be changed with a small stress as compared with when the first optical layer 11L includes the solid material.

It should be noted that, a solid material may be used as the first optical layer 11L. In this case, for example, as in the second embodiment, the layer thickness of the first optical layer 11L may be changed by pressing the first optical layer 11L by the pair of second optical layers 11H with the first optical layer 11L interposed therebetween.

Modification 8

In the above embodiment, a configuration example of the variable wavelength interference filters 11, 11A and 11B is illustrated in which the first optical member 112 is laminated on the substrate 111 and the second optical member 113 is laminated through the gap forming spacer 115, but not limited thereto.

For example, the gap forming spacer 115 may not be provided. That is, it may be configured such that the first optical member 112 is provided on the substrate 111, a part of the second optical member 113 is bonded on the first optical member 112, and the other part of the second optical member 113 is spaced away from the first optical member 112 by the air gap G. In order to form such a variable wavelength interference filter, for example, the first optical member 112 and the third electrode 114A are formed on the substrate 111, and then a sacrificial layer is formed on a part of the first optical member 112. Then, the fourth electrode 114B is formed on the sacrificial layer, the second optical member 113 is formed on the first optical member 112 to cover the entire sacrificial layer, the first optical member 112 and the second optical member 113 are bonded, and finally the sacrificial layer is removed by etching or the like. As a result, it is possible to form a variable wavelength interference filter in which the first optical member 112 and the second optical member 113 face each other without using a spacer or the like.

Figure 11:
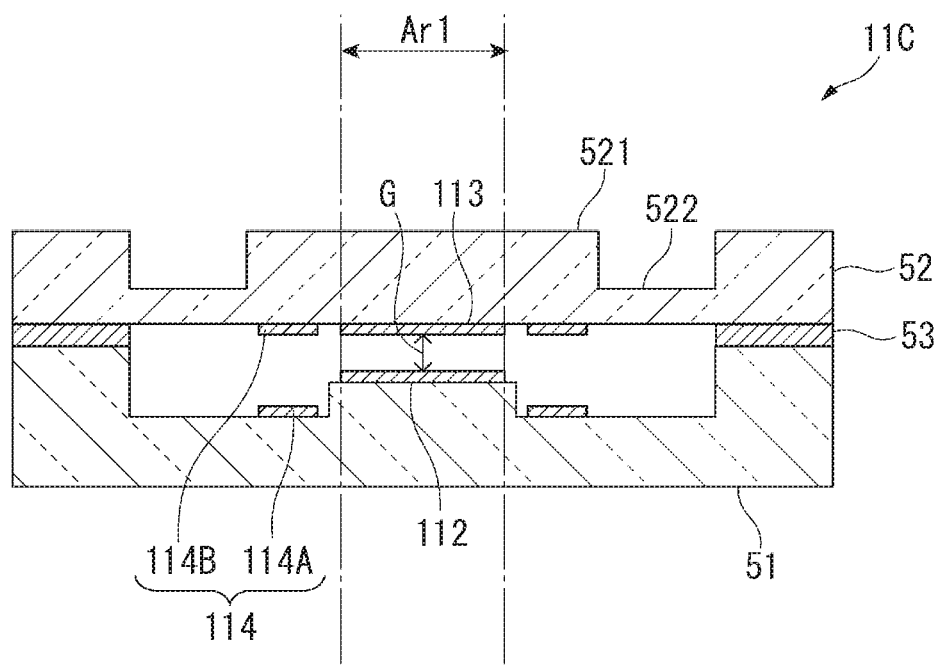
FIG. 11 is a diagram showing a schematic configuration of a variable wavelength interference filter according to a modification.

FIG. 11 is a schematic cross-sectional view showing a configuration of a variable wavelength interference filter 11C including two substrates.

Likewise the variable wavelength interference filter 11C shown in FIG. 11, it may be configured such that the first optical member 112 is provided on a first substrate 51, the second optical member 113 is provided on a second substrate 52, and the first substrate 51 and the second substrate 52 are bonded to each other by a bonding layer 53. In this case, a movable unit 521 including the second optical member 113 and a diaphragm 522 for displacing the movable unit 521 toward the first substrate 51 side may be formed on the second substrate 52. Further, the interference region Ar1 may be expanded by forming the third electrode 114A constituting the gap changing unit 114 on the first substrate 51 and forming the fourth electrode 114B on the second substrate 52.

In the above embodiment, an example is illustrated in which the gap changing unit 114 includes the third electrode 114A and the fourth electrode 114B, but not limited thereto.

For example, the gap dimension of the air gap G may be changed by disposing a piezoelectric body between the first optical member and the second optical member and changing the voltage applied to the piezoelectric body. Further, a gap between the first optical member and the second optical member may be a sealed space, and the pressure in the sealed space may be changed, so that the gap dimension of the air gap G is changed.

In addition, the specific structure at the time of implementation of this disclosure can be suitably changed into another structure or the like within the scope that can achieve the objective of this disclosure.

What is claimed is:

1. An optical device comprising:
a pair of optical members that face each other across a gap;
a gap changing driver that is configured to change a dimension of the gap,
wherein each of the optical members has a plurality of first optical layers and a plurality of second optical layers that are alternately laminated, the second optical layers each having a refractive index different from that of each of the first optical layers;
each optical member has a respective layer thickness changing actuator that changes a thickness of the first optical layer in a lamination direction of the plurality of first optical layers and the plurality of second optical layers,
and
the gap changing driver is separate and apart from the respective layer thickness changing actuators.

2. The optical device according to claim 1, wherein
the plurality of first optical layers are fluid layers formed of a fluid,
a pair of electrodes is disposed with the first optical layers interposed therebetween in the lamination direction, and
the layer thickness changing actuator changes a voltage applied between the pair of electrodes.

3. The optical device according to claim 1, wherein
the plurality of first optical layers are fluid layers formed of a fluid,
the plurality of second optical layers have conductivity, and
the layer thickness changing actuator changes a voltage applied between two second optical layers disposed at both ends with respect to the lamination direction.

4. An optical device comprising:
a pair of optical members that are attached to a spacer positioned between the pair of optical members, the spacer defining a gap between the pair of optical members and the pair of optical members facing each other across the gap;
a gap changing driver that is configured to change a dimension of the gap; and
a refractive index changing unit that is configured to apply a voltage,
wherein each of the optical members has a plurality of first optical layers and a plurality of second optical layers that are alternately laminated, the second optical layers each being formed of an electro-optical crystal;
the refractive index changing unit that is configured to apply the voltage applies the voltage to each of the second optical layers to change a refractive index of the electro-optical crystal of the second optical layers
and
the gap changing driver is separate and apart from the refractive index changing unit.

5. The optical device according to claim 1, wherein
the gap changing driver is configured to change the dimension of the gap to adjust a wavelength of light transmitted through the pair of optical members, and
the layer thickness changing actuator is configured to change the thicknesses of the first optical layers according to the wavelength of the light transmitted through the pair of optical members.

6. The optical device according to claim 4, wherein
the gap changing driver is configured to change the dimension of the gap to adjust a wavelength of light transmitted through the pair of optical members, and
the refractive index changing unit is configured to change the refractive indexes of the second optical layers according to the wavelength of the light transmitted through the pair of optical members.

7. An electronic device comprising:
the optical device according to claim 1; and
a control unit that controls the optical device.

* * * * *